United States Patent [19]
Cholewa et al.

[11] Patent Number: 5,100,507
[45] Date of Patent: Mar. 31, 1992

[54] FINISHING TECHNIQUES FOR LENSED OPTICAL FIBERS

[75] Inventors: Mark B. Cholewa, Mt. Penn Township, Berks County; Lee H. Fisher, North Catasauqua; Lawrence A. Greenberg, Allentown, all of Pa.

[73] Assignee: AT&T Bell Laboratories, Murray Hill, N.J.

[21] Appl. No.: 648,467

[22] Filed: Jan. 31, 1991

[51] Int. Cl.⁵ .................. B44C 1/22; C03C 15/00; C03C 25/06; C23F 1/00

[52] U.S. Cl. .................. 156/651; 156/652; 156/657; 156/656; 156/659.1; 156/663; 65/31; 427/163

[58] Field of Search .............. 156/651, 652, 656, 657, 156/659.1, 663, 668; 350/96.20, 96.29; 65/3.3, 3.31, 3.4, 31; 427/163; 204/192.26, 14.1, 27

[56] References Cited

U.S. PATENT DOCUMENTS

| | | | |
|---|---|---|---|
| 4,119,363 | 10/1978 | Camlibel et al. | 350/96.20 |
| 4,265,699 | 5/1981 | Ladany | 156/663 X |
| 4,407,561 | 10/1983 | Wysocki | 350/96.3 |
| 4,410,567 | 10/1983 | France et al. | 427/163 |
| 4,469,554 | 9/1984 | Turner | 156/657 |
| 4,622,055 | 11/1986 | Mathyssek et al. | 65/2 |
| 4,708,429 | 11/1987 | Clark et al. | 350/96.20 |
| 4,799,949 | 1/1989 | Keck et al. | 65/3.12 |
| 4,803,689 | 2/1989 | Shibanuma | 372/36 |

OTHER PUBLICATIONS

"A High Performance Connectorized LED Package...," *IEEE Trans. Comp., Hybrids and Manuf. Tech.*, vol. CHMT-4, No. 4, Dec. 1981, H. M. Berg et al. pp. 337-344.

"A Packaging Technique to Achieve Stable...," *SPIE*, vol. 703, 1986, S. Enochs pp. 42-47.

*Primary Examiner*—William A. Powell
*Attorney, Agent, or Firm*—Wendy W. Koba

[57] ABSTRACT

A method is disclosed for processing an optical fiber to include an integral lens and a metallized outer coating. The fiber is first etched to include a tapered transition region and a thinned end region. The etched fiber is subsequently metallized and covered with a protective coating. A wet chemical etching technique is used to form an integral lens over the endface of the fiber. The protective coating is then stripped and any free metal is removed. The method allows for the fiber metallization to be in relative close proximity to the lens such that the fiber may be soldered into place near its endface, limiting any subsequent movement of the fiber relative to the aligned optical device.

16 Claims, 2 Drawing Sheets

FINISHING TECHNIQUES FOR LENSED OPTICAL FIBERS

BACKGROUND OF THE INVENTION

1. Technical Field

The present invention relates to a finishing technique for optical fibers and, more particularly, to tapering and metallization techniques for optical fibers including a lensed endface.

2. Description of the Prior Art

For most optical communication applications, it is necessary to align and fix the position of an optical fiber with respect to a transmitting or receiving device. In general, optical fibers are often processed to include a metallic outer coating such that the metal may be soldered to a fixed reference plane and facilitate alignment. The metallic coating may further allow for a fiber to be hermetically sealed to the optical device package. One such arrangement for providing both alignment and hermeticity is disclosed in U.S. Pat. No. 4,119,363 is issued to I. Camlibel et al. on Oct. 10, 1978. In the Camlibel et al. arrangement, a bare optical fiber is centered through a metal tube disposed within a package wall and a cylindrical, narrow bore solder preform is disposed within the tube. The preform is heated to a molten state and the fiber is adjusted within the molten solder to achieve optimum coupling to the laser. The solder, upon solidifying and cooling, squeezes against the fiber and forms a hermetic seal. The Camlibel et al. arrangement, however, may result in some misalignment of the fiber during the cooling process. Further, the package cannot thereafter be exposed to elevated temperatures which may soften the solder and allow the fiber to move.

In order to increase the coupling between an optical device and fiber, a lens may be inserted in the optical path between the device and the fiber. The lens may either comprise a discrete element which must be aligned to both the device and the fiber, or a device which is attached directly to the endface of the fiber. When utilizing a fiber including a metallic coating, problems may exist with the latter arrangement where the presence of the metal may interfere with the integrity of the attachment. U.S. Pat. No. 4,622,055 issued to K. Mathyssek et al. on Nov. 11, 1986 discloses a method for removing a metallic coating from the fiber tip area such that a lens may be epoxied onto the endface of a bare glass fiber. In particular, the fiber is passed through an arc or flame where it is softened to the point that the glass constricts and separates from the metallic coating. The fiber is then drawn and cleaved such that an endface is formed which is free of the metallic coating. A lens may then be attached to the cleaved endface. A problem may arise, however, in controlling the attachment of the lens to the fiber tip, which can result in increasing the time and expense involved in forming such a lensed fiber.

In contrast to the process of attaching a lens to the fiber endface, there exist various wet chemical etching techniques for forming an integral lens directly on the fiber endface. By controlling various etching parameters, for example, the fiber cladding may be removed such that the core region remains exposed. Other techniques exist for preferentially etching the cladding with respect to the central core region. However, there have arisen problems in both tapering a lensed fiber and applying a metallic coating to such fibers including an integral lens, since these processes have been found to affect the properties of such an integral lens.

Therefore, a need remains in the prior art for a method of finishing an optical fiber which does not alter the property of an integral lens formed on the endface thereof.

SUMMARY OF THE INVENTION

The need remaining in the art is addressed by the present invention which relates to a finishing technique for optical fibers and, more particularly, to tapering and metallization techniques appropriate for optical fibers including a lensed endface.

In accordance with an exemplary process of the present invention, the following steps may be performed: (1) etching a stripped optical fiber to form a tapered transition region and a thinned end region; (2) metallizing the tapered fiber; (3) covering the metallization with a protective overcoat; (4) cleaving the fiber in the transition region; (5) lensing the exposed fiber endface; and (6) removing the protective overcoat. In some applications, the metallization step is not required. The tapering and protective coating steps are utilized to maintain the desired outer diameter of the fiber endface during the subsequent lensing operation. In other applications, steps (2) and (3) may be combined and step (6) eliminated when a relatively thick metallization layer is used as both the final metal layer and the protective overcoat.

In forming the tapered transition region, the fiber may be exposed to a fluorine-based etchant (e.g., buffered hydrofluoric acid) for a period of time sufficient to form a taper, without completely removing the exposed core region. The metallization may consist of layers of titanium, platinum and gold which are sputter deposited over the fiber. A resist, or any other material suitable for protecting the metallic layer (and/or the underlying glass fiber) from subsequent lensing operations, may be used as a protective overcoat. An exemplary fiber lensing operation may comprise exposing the endface of the fiber to a combination of an etchant (e.g., buffered hydrofluoric acid) and a treating agent (e.g., acetic acid or citric acid), as disclosed in assignee's co-pending application Ser. No. 486,630 (G. E. Blonder et al.), filed Feb. 28, 1990 and herein incorporated by reference.

An advantage of the technique of the present invention is that the metal may be disposed in relative close proximity to the fiber lens, since the metal is deposited prior to the lens formation. The presence of the metal coating so close to the lens allows for the fiber to be soldered in place very near the tip of the fiber, thus limiting any subsequent movement of the lensed fiber relative to an aligned optical device.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
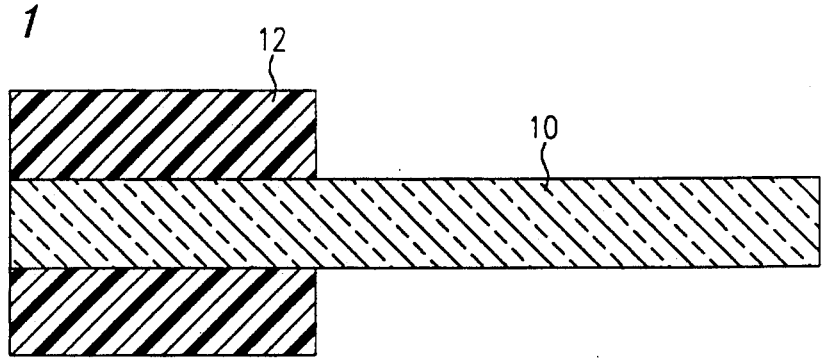
FIGS. 1–8 illustrate, in sequence, various steps incorporating the techniques of the present invention utilized in forming a finished optical fiber including an integral lens.
Figure 2:
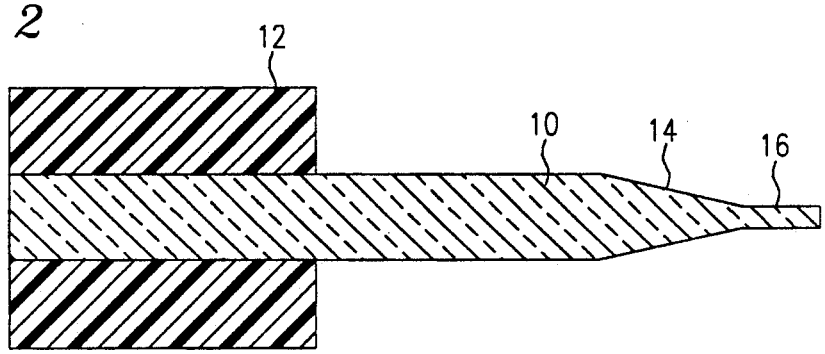

An end section of an optical fiber 10 is illustrated in FIG. 1, where outer layer 12 (a conventional polymer coating) is removed using any suitable stripping process well-known in the optical fiber processing art. Subsequent to the stripping of layer 12, fiber 10 is etched to form a transition region 14 and thinned end region 16, as shown in FIG. 2. For example, a hydrofluoric acid bath may be used to form the structure of FIG. 2.

Figure 3:
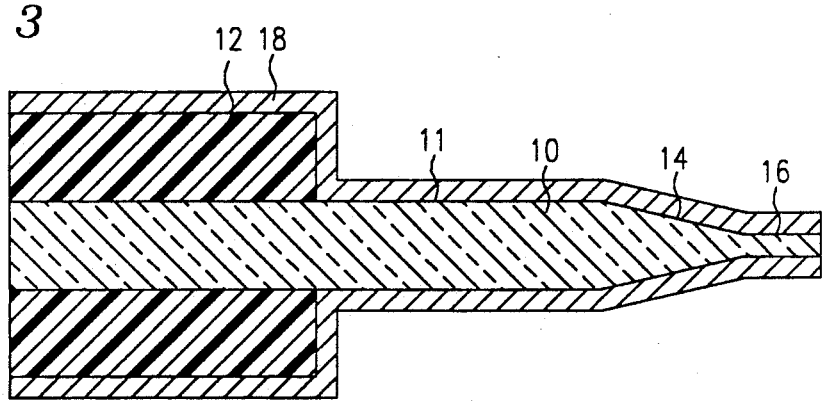

For applications requiring the use of a metal coating (for attaching the fiber to an alignment fixture, for example), a metallic coating 18 is then formed over outer surface 11 of fiber 10, as shown in FIG. 3. In one embodiment, coating 18 may comprise a tri-layered structure of titanium, platinum and gold, where the layers are consecutively sputtered over surface 11 of fiber 10. Alternatively, coating 18 may be formed by electroplating metals such as nickel or gold onto the fiber surface. A combination of deposited and plated nickel, followed by a layer of plated gold may also be used. It is to be understood that the techniques of the present are not limited by either the materials utilized to form the metallic coating or the process used to apply the coating to the fiber.

Figure 4:
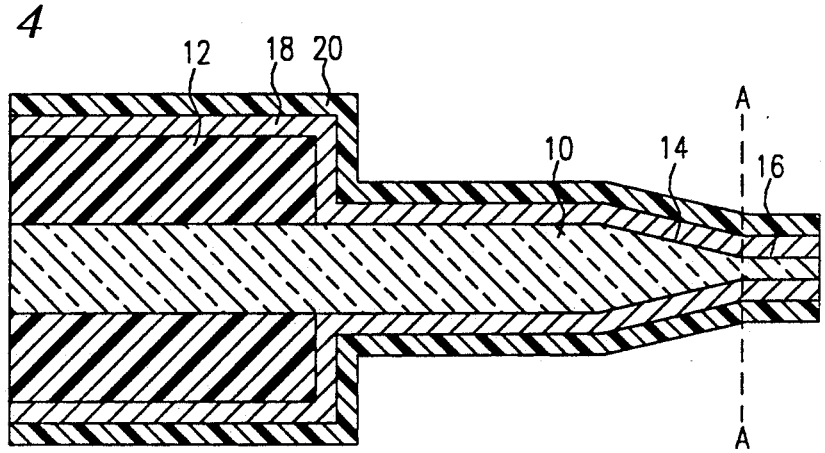

To protect metallic coating 18 from subsequent processing operations, a protective overcoat 20 is deposited to substantially cover layer 18, as shown in FIG. 4. Protective overcoat 20 may comprise a resist, or any other suitable material which will be impervious to acids or any other materials used in subsequent etching (i.e., lensing) operations. The coated fiber is then cleaved in the area between transition region 14 and thinned end region 16, as indicated by dotted line A in FIG. 4.

Figure 5:
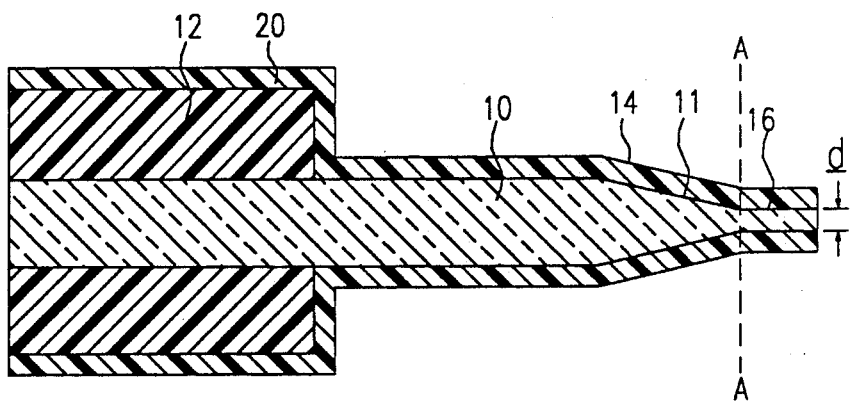
Figure 6:
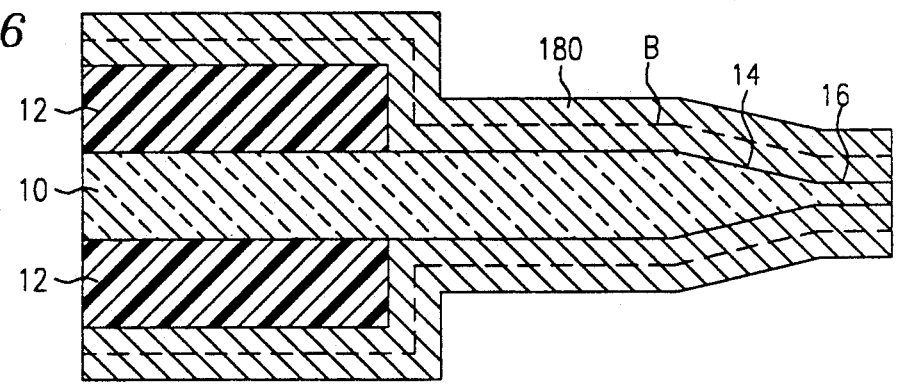

As mentioned above, there may be applications where a metallic coating is not required. In this case, protective overcoat 20 is formed directly on surface 11 of fiber 10, as shown in FIG. 5. As with the above-described embodiment, the fiber of FIG. 5 is cleaved along the indicated dotted line in the area between transition region 14 and thinned end region 16. Here, the existence of protective overcoat 20 during the lensing operation results in maintaining the diameter d of fiber 10 as the lens is being formed. The lensed fiber may then be inserted in conventional fiber optic connectors which are designed for use with a fiber of the predetermined diameter d. Alternatively, applications may exist where the combination of metal layer 18 and protective overcoat 20 may be replaced by a relatively thick metal layer 180. FIG. 6 illustrates an exemplary fiber 10 of this form. Here, the outer portion of metal layer 180 may be etched during the subsequent lensing operation, as indicated by dotted line B. However, a sufficient underlying portion remains at the end of the etch process such that attachment of the fiber to an alignment fixture may be achieved.

Figure 7:
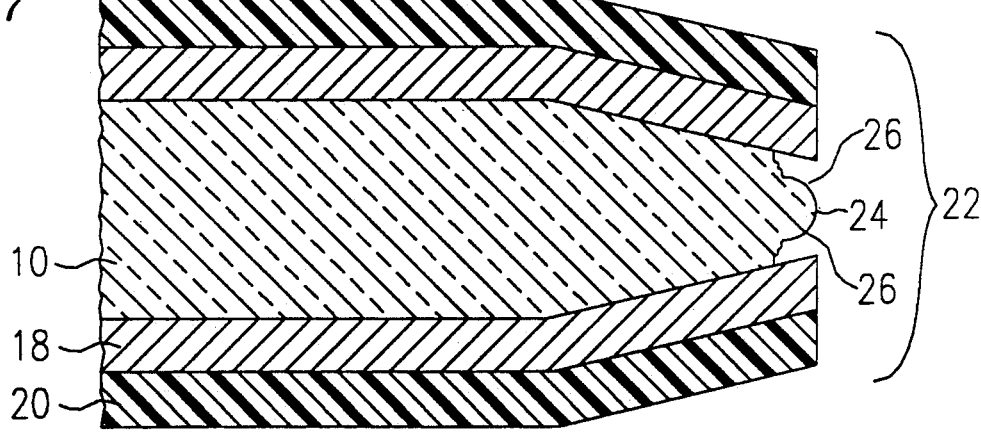

Once the fiber is cleaved, the exposed endface 22 of fiber 10 may be lensed, as shown in FIG. 7 (which illustrates an enlarged view of the end portion of fiber 10). One exemplary lensing technique requires the exposure of endface 22 to a combination of an etchant (e.g., hydrofluroic acid or a buffered oxide etch) and a treating agent (e.g., acetic acid or citric acid) which preferentially etches the fiber cladding material with respect to the core area and forms an integral lens shape comprising a frustrum of a cone over the core area. This particular lensing technique is disclosed in detail in co-pending application Ser. No. 486,630, referred to above. As shown in FIG. 7, the lensing process results in the formation of a lens 24 at endface 22 of fiber 10. It is to be understood that there exist various other chemical etching processes which may be used to form a lens during the procedure of the present invention. During the etch process, the perimeter of fiber 10 may be undercut, forming edge regions 26, as illustrated in FIG. 7.

Figure 8:
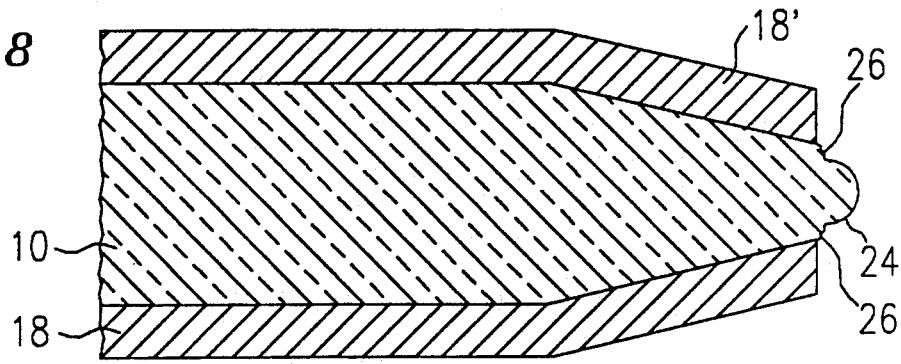

At the completion of the lensing operation, protective coating 20 (if present) may be removed using standard treatments for the removal of the resist, or the like. The free portion of metallic coating 18 extending beyond the exposed end surface of fiber 10 (i.e., edge portions 26 and lens 24) may be removed utilizing a conventional ultrasonic cleaning technique. The resultant metallized, lensed fiber is illustrated in FIG. 8. As shown, the process of the present invention results in forming a fiber including metallization 18 in relative close proximity to lens 24. Therefore, portion 18' of coating 18 near the tip of fiber 10 may be soldered to an alignment fixture (not shown), resulting in limiting any subsequent motion of the fiber relative to an aligned optical device (not shown). As mentioned above, a particular lensing operation may result in forming undercut regions 26 such that an end portion of fiber 10 is not metallized. However, metal layer 18 will be included along the tapered transition region 14 and is in relatively close proximity to lens 24 such that attachment near the fiber endface may be realized.

We claim:

1. A method of processing an optical fiber comprising the steps of:
   a) providing a stripped optical fiber;
   b) etching said stripped optical fiber to form a tapered transition region and a thinned end region;
   c) forming a protective coating over the etched fiber;
   d) cleaving the fiber within the transition region so as to expose a fiber endface;
   e) etching the cleaved fiber of step d) so as to form an integral lens over the exposed fiber endface.

2. The method of claim 1 wherein in performing step c), a relatively thick metallic layer is used as the protective coating.

3. The method of claim 1 wherein in performing step c), a non-metallic layer is used as the protective coating.

4. The method of claim 3 wherein the method comprises the further step of f) removing the protective coating.

5. The method of claim 3 wherein the process further comprises the step of metallizing the etched fiber of step b) before forming the protective coating of step c).

6. The method of claim 5 wherein the process comprises the further step of removing free metal exposed by the etching process of step e).

7. The method of claim 6 wherein ultrasonic cleaning is used to remove the metal.

8. The method of claim 5 wherein the metallization is sputter deposited onto the fiber.

9. The method of claim 5 wherein the metallization is electroplated onto the fiber.

10. The method of claim 5 wherein the metallization is formed utilizing chemical vapor deposition, followed by electroplating.

11. The method of claim 5 wherein the metallization comprises separate layers of titanium, platinum and gold.

12. The method of claim 5 wherein the metallization comprises separate layers of nickel and gold.

13. The method of claim 5 wherein the metallization comprises separate layers of deposited nickel, plated nickel and plated gold.

14. The method of claim 5 wherein the metallization comprises gold.

15. The method of claim 1 wherein in performing step b), a hydrofluoric acid bath is used.

16. The method of claim 1 wherein in performing step e), the fiber is exposed to a combination of an etchant and a treating agent such that an integral lens is formed.

* * * * *